United States Patent
Schwartz et al.

(10) Patent No.: US 9,355,355 B2
(45) Date of Patent: May 31, 2016

(54) RULE BASED AUTOMATION

(75) Inventors: Dror Schwartz, Yehud (IL); Amir Kessner, Ramat-Gan (IL); Amon Mathias, Kfar-Sava (IL); Ithai Levi, Hod-Hasharon (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 1442 days.

(21) Appl. No.: 12/830,233

(22) Filed: Jul. 2, 2010

(65) Prior Publication Data

US 2012/0005146 A1     Jan. 5, 2012

(51) Int. Cl.
*G06F 17/00*        (2006.01)
*G06N 5/02*        (2006.01)

(52) U.S. Cl.
CPC ..................... *G06N 5/025* (2013.01)

(58) Field of Classification Search
None
See application file for complete search history.

(56) References Cited

U.S. PATENT DOCUMENTS

| | | | | |
|---|---|---|---|---|
| 6,349,393 | B1 * | 2/2002 | Cox ........................... | 714/38.12 |
| 6,754,701 | B1 * | 6/2004 | Kessner .............. | G06F 11/3414 709/203 |
| 7,080,142 | B2 * | 7/2006 | Galloway et al. ............. | 709/224 |
| 7,289,988 | B2 * | 10/2007 | Joseph | |
| 7,478,365 | B2 * | 1/2009 | West et al. ..................... | 717/124 |
| 8,443,292 | B2 * | 5/2013 | Aronov ............... | G06F 11/3688 715/763 |
| 8,510,652 | B1 * | 8/2013 | Armon .............. | G06F 17/30867 715/273 |
| 8,572,095 | B2 * | 10/2013 | Schwartz .......... | G06F 17/30607 707/748 |
| 8,621,486 | B2 * | 12/2013 | Schwartz ............ | G06F 11/3668 719/318 |
| 8,677,324 | B2 * | 3/2014 | Markuza ............. | G06F 11/3414 717/124 |
| 8,819,631 | B2 * | 8/2014 | Monza ................ | G06F 9/45516 717/115 |
| 8,874,736 | B2 * | 10/2014 | Levi ........................ | H04L 43/50 370/252 |
| 8,881,110 | B2 * | 11/2014 | Schwartz ............ | G06F 11/3688 717/115 |
| 8,903,833 | B2 * | 12/2014 | Schwartz .......... | G06F 17/30864 707/748 |

(Continued)

OTHER PUBLICATIONS

Goal event detection in broadcast soccer videos by combining heuristic rules with unsupervised fuzzy c-means algorithm Yina Han; Guizhong Liu; G. Chollet Control, Automation, Robotics and Vision, 2008. ICARCV 2008. 10th International Conference on Year: 2008 pp. 888-891, DOI: 10.1109/ICARCV.2008.4795635 IEEE Conference Publications.*

(Continued)

*Primary Examiner* — Michael B Holmes
(74) *Attorney, Agent, or Firm* — Hewlett Packard Enterprise Patent Department

(57) ABSTRACT

Techniques for rule-based automation of an application are disclosed herein. In one embodiment, a system includes an event processor, a rule engine, and a plurality of rules. The event processor is configured to detect events affecting execution of an application being monitored by the automation system. Each rule is configured to analyze at least one of the detected events and to provide a result of the analysis that is further analyzed by a different one of the rules. The rule engine is coupled to the event processor and the plurality of rules. The rule engine is configured to apply each rule to at least one of the detected events based on a value of the rule that determines an event type that the rule is configured to analyze.

20 Claims, 3 Drawing Sheets

(56) References Cited

U.S. PATENT DOCUMENTS

| | | | |
|---|---|---|---|
| 9,015,337 B2* | 4/2015 | Hemed | H04L 43/50 370/251 |
| 9,053,241 B2* | 6/2015 | Schwartz | G06F 11/3692 |
| 9,223,647 B2* | 12/2015 | Schwartz | G06F 9/45512 |
| 2004/0030710 A1* | 2/2004 | Shadle | 707/102 |
| 2004/0172253 A1* | 9/2004 | Singh | 704/270.1 |
| 2006/0253742 A1 | 11/2006 | Elenburg et al. | |
| 2006/0294222 A1* | 12/2006 | Araujo et al. | 709/224 |
| 2007/0168505 A1* | 7/2007 | Devadoss et al. | 709/224 |
| 2008/0092119 A1 | 4/2008 | Sweis | |
| 2008/0294941 A1* | 11/2008 | Copstein et al. | 714/38 |
| 2009/0030866 A1* | 1/2009 | Aoyama | 706/47 |

OTHER PUBLICATIONS

Event model interfaces for heterogeneous system analysis K. Richter; R. Ernst Design, Automation and Test in Europe Conference and Exhibition, 2002. Proceedings Year: 2002 pp. 506-513, DOI: 10.1109/Date.2002.998348 IEEE Conference Publications.*

Ontology-Driven Event Detection and Indexing in Smart Spaces Z. Li; C. H. Chu; W. Yao; R. A. Behr Semantic Computing (ICSC), 2010 IEEE Fourth International Conference on Year: 2010 pp. 285-292, DOI: 10.1109/ICSC.2010.63 IEEE Conference Publications.*

An automatic incremental updating solution for multi-scale spatial database Y. Ye; B. Chen; B. Wan; S. Zhou Information and Automation, 2009. ICIA '09. International Conference on Year: 2009 pp. 693-697, DOI: 10.1109/ICINFA.2009.5205010 IEEE Conference Publications.*

* cited by examiner

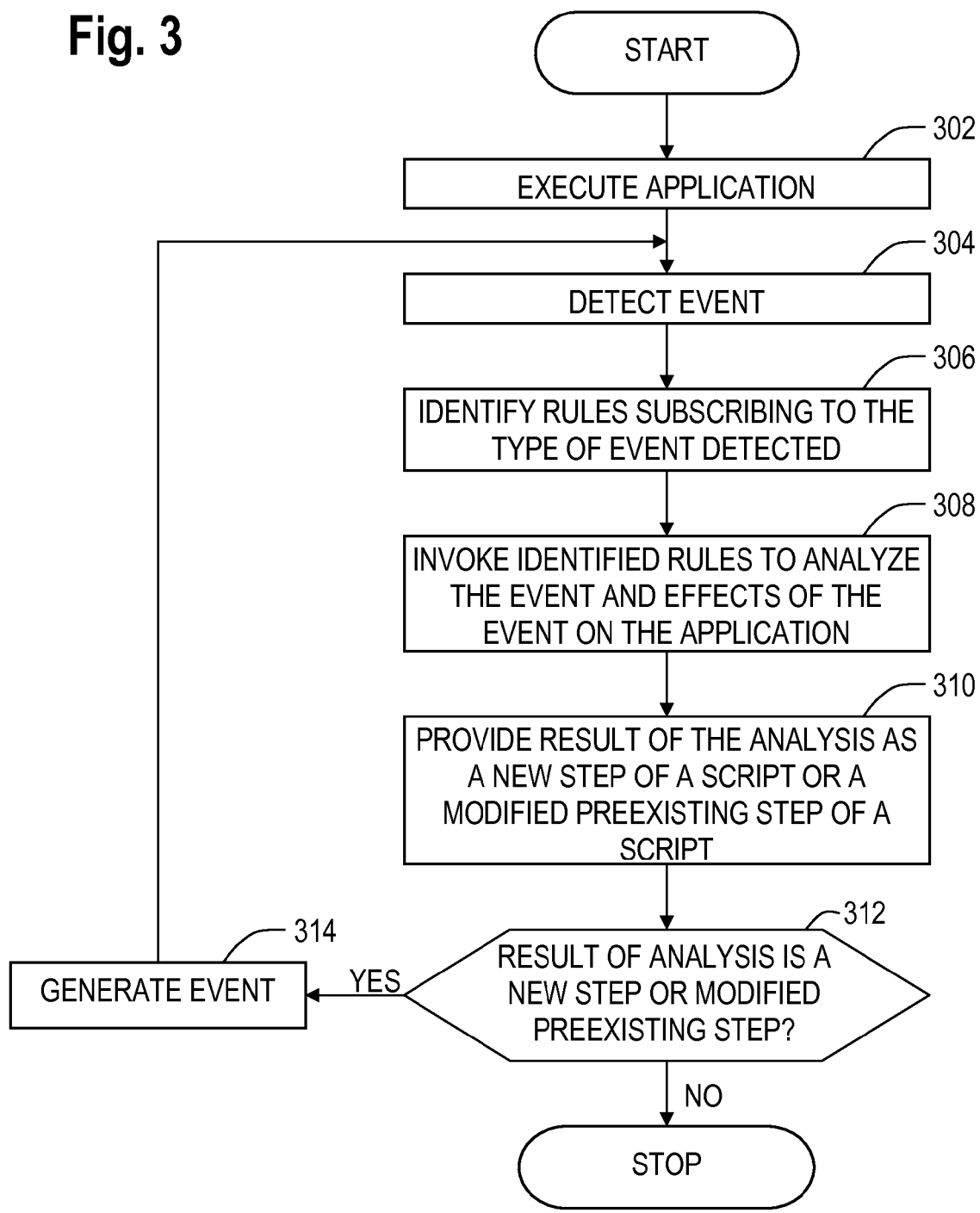

RULE BASED AUTOMATION

BACKGROUND

Application programs, including web-based applications such as web pages, and the hardware associated with the applications, are often tested under extreme use conditions. Such conditions may be provided by a system that simulates a number of users simultaneously executing the application. A user may be simulated by execution of a program, for example a previously acquired script that provides appropriate user inputs and responses to exercise the application.

BRIEF DESCRIPTION OF THE DRAWINGS

For a detailed description of exemplary embodiments of the invention, reference will now be made to the accompanying drawings in which:

FIG. 3 shows a flow diagram for a method for rule based automation of an application in accordance with various embodiments.

NOTATION AND NOMENCLATURE

Figure 1:
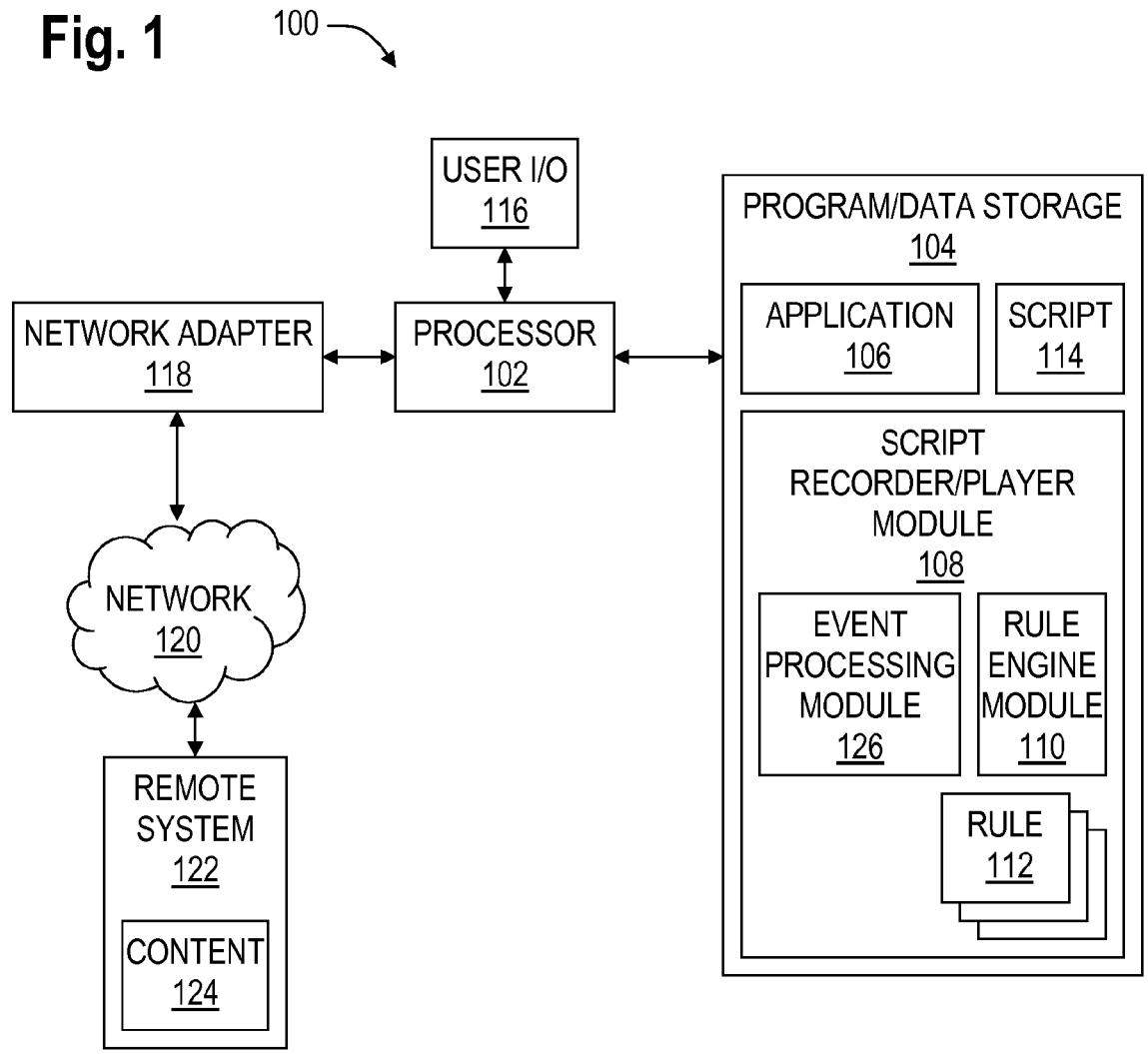
FIG. 1 shows a block diagram for a system that includes rule based automation of an application in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Applications based on the World Wide Web (i.e., web applications) have increased in functionality and complexity to the extent that they now resemble desktop or thick-client applications. A web page's document object model ("DOM") can be dynamically changed using Asynchronous JavaScript and XML ("AJAX") calls. Many more elements are presented on the display of a modern web application than were presented in the past, and interaction between client and server is not always predictable. New AJAX frameworks, each having a different DOM and Javascript implementation and serving as a basis for web applications, are introduced on a regular basis. Thus, the changing web application development and execution environment makes recording and replaying scripts intended to automate operation of such applications increasingly difficult. Consequently, traditional approaches to web automation scripting are often unsuccessful.

Embodiments of the present disclosure provide a flexible framework for automating web applications. Embodiments use a collection of decoupled rules acting as domain specific experts to facilitate recording and replay of web automation scripts. Rules are invoked based detection of various events occurring as the web application is executed. All rules share a dynamic DOM representing different aspects of the automation script. By manipulating the model new events are generated which invoke additional rules until the system settles into an optimized state. Thus, embodiments provide a flexible and effective means of automating applications in a wide variety of execution environments.

FIG. 1 shows a block diagram for a system 100 that includes rule based automation of an application 106 in accordance with various embodiments. The system 100 includes program/data storage 104 and one or more processors 102. Some embodiments of the system 100 also include a network adapter 118 and user I/O devices 116. These elements of the system 100 may be embodied in a computer as is known in the art. Desktop computers, server computers, notebook computers, handheld computers, etc. are exemplary computers that may suitably embody components of the system 100.

The processor 102 is configured to execute instructions read from a computer readable medium, and may, for example, be a general-purpose processor, digital signal processor, microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The program/data storage 104 is a computer-readable medium coupled to and accessible to the processor 102. The storage 104 may be volatile or non-volatile semiconductor memory (e.g., FLASH memory, static or dynamic random access memory, etc.), magnetic storage (e.g., a hard drive, tape, etc.), optical storage (e.g., compact disc or digital versatile disc), etc. Various programs executable by the processor 102, and data structures manipulatable by the processor 102 may be stored in the storage 104.

User I/O devices 116 coupled to the processor 102 may include various devices employed by a user to interact with the processor 102 based on programming executed thereby. Exemplary user I/O devices 116 include video display devices, such as liquid crystal, cathode ray, plasma, organic light emitting diode, vacuum fluorescent, electroluminescent, electronic paper or other appropriate display panels for providing information to the user. Such devices may be coupled to the processor 102 via a graphics adapter. Keyboards, touchscreens, and pointing devices (e.g., a mouse, trackball, light pen, etc.) are examples of devices includable in the I/O devices 116 for providing user input to the processor 102 and may be coupled to the processor by various wired or wireless communications subsystems, such as Universal Serial Bus or Bluetooth.

A network adapter 118 may coupled to the processor 102 to allow the processor 102 to communicate with a remote system 122 via the network 120, and to, for example, acquire content 124 (e.g., web pages, applications, images, audio, etc.) from the remote system 122. The network adapter 118 may allow connection to a wired or wireless network, for example, in accordance with IEEE 802.11, IEEE 802.3, Ethernet, a cellular network, etc. The network 120 may comprise any available computer networking arrangement, for example, a local area network ("LAN"), a wide area network ("WAN"), a metropolitan area network ("MAN"), the internet, etc. Further, the network 120 may comprise any of a variety of networking technologies, for example, wired, wireless, or optical techniques may be employed. Accordingly, the remote system 122 is not restricted to any particular location or proximity to the processor 102.

Referring again to the program/data storage 104, various data and program modules are shown stored therein. The application 106 may be, for example a web page, web application, or other application to be automated. The application 106 may comprise a portion of the content 124 provided by the remote system 122. In some embodiments, the application 106 represents a portion of an application retrieved from the remote system 122 wherein different portions of the application 106 are executed by the processor 102 and a different processor of the remote system 122. The application 106 may include executable programming and various user selectable/modifiable control features (e.g., links, buttons, etc).

The script recorder/player module 108, when executed by the processor 102, monitors user generated and other system 100 events affecting the application 106. The script recorder/player module 108 analyzes the detected events and effects on the application 106 ensuing from the detected events, and records various results of the analyses as steps in the script 114. The script recorder/player module 108 is also configured to execute the script 114 to replicate the operations previously recorded. In some embodiments, the script 114 includes as set of dynamic shared object containers, the data structures of which can be configured to form a DOM-like document.

The script recorder/player module 108 includes an event processing module 126, a rule engine module 110, and a plurality of rules 112. The event processing module 126 detects various events in the system 100 related to execution of the application 106. The event processing module 126 may include one or more event detectors each directed to detection of a different type of event. For example, a first event detector may be configured to detect user input event, such as movement or selection via a pointing device (e.g., a user input device 116). A second event detector may be configured to detect changes in the script 114. A third event detector may be configured to detect changes in the structure or data of the application (e.g., changes in the application DOM).

Each rule 112 is executable by the processor 112, and can read and manipulate the storage structures of shared object model of the script 114. Each rule 112 acts as an expert with regard to a particular operation domain affecting the application 106. Additionally, rules 112 may generally be related to types of events. For example, a first rule may be configured to analyze movement of a user input device 116. A second rule may be configured to analyze entry operations of a user input device 116 (e.g., mouse button down, mouse button up).

A rule 112 may also access the application 106 (e.g., a DOM representation of the application 106) to identify changes to the application 106 resulting from an event. For example, a third rule may be configured to determine that a user entry operation (e.g., a mouse button down operation) followed by a pointer device motion results in movement of an object selected via the entry operation (e.g., an object being dragged). A fourth rule may be configured to identify movement of a particular object (e.g., a slider) that results in a change in an application parameter (e.g., movement of slider control changes a value associated with the slider).

Each rule 112 is associated with one or more particular types of event or with a family of events. When an event is detected by the event processing module 126, the event processing module 126 determines the type of event detected and passes information about the event, including the event type, to the rule engine module 110. Based on the event type, the rule engine module 110 determines which of the rules 112 are applicable to the detected event, and invokes each applicable rule 112 to perform analysis of the event. Whether a rule 112 is applicable to an event is determined based on a subscription value associated with the rule 112 that defines the types of events to which the rule 112 should be applied.

Results on rule 112 analysis of an event, etc. are stored in objects of the shared object model of the script 114 as steps available to replicate user input operations when the script 114 is replayed. Each rule 112 can manipulate the structures of the shared object model. Manipulations of the script 114, such as modifying a pre-existing script object or creating a new script object are events detected by the event processing module 126. Thus, processing of an event by a rule 112 can result in further invocation of rules 112 subscribing to the event resulting from the processing. Such recursive invocation of rules 112 allows the script recorder/player module 108 to record meaningful steps representing actual operations affecting the application 106, rather than merely recording lower level operations such as network requests or pointer operations. For example, if a user drags a slider control of the application 106 to a specific value, the rules 112 may record a "set slider value" step, rather than merely recording a set of mouse movement steps. Additionally, recording operations at a higher level allows affected values to be recorded in the proper context. For example, changing values can be recorded in appropriate units (e.g., currency, time, measurements, etc.) rather than low-level units (e.g., mouse movement units) that may be dependent on application 106 stability for proper reproduction. Recording operations affecting the application 106 at a higher level improve script operability, for example, in conditions where the application 106 is subject to change (e.g., the slider position on a web page is changed from one revision to the next of the application 106).

Each rule 112 is independent and isolated from each other rule 112. No rule 112 is dependent on or invoked by any other rule 112. Thus, addition and/or removal of rules 112 from the system 100 is simplified as no dependencies need be considered.

In some embodiments, one effect of executing a pre-defined rule 112 may be generation of a new rule not previously included among the rules 112. Such a machine-generated rule 112 can operate in the same manner as a pre-defined rule 112.

Figure 2:
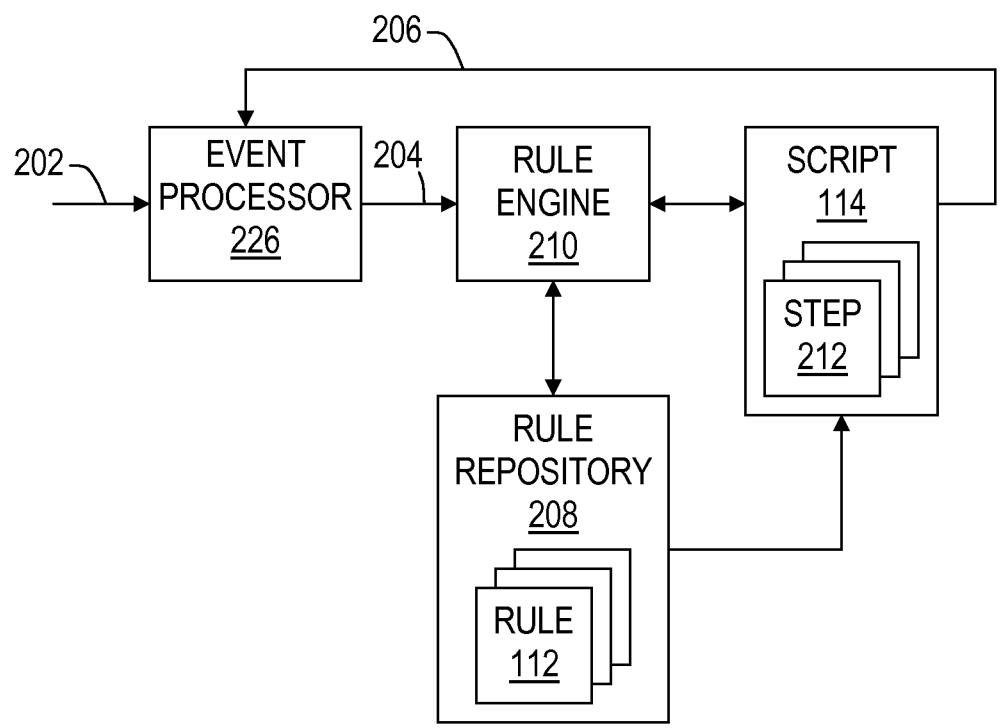
FIG. 2 shows a block diagram for a system for rule based automation of an application in accordance with various embodiments.

FIG. 2 shows a block diagram for a system for rule-based automation of an application in accordance with various embodiments. A event 202 is presented to the event processor 226. The event 202 may, for example, be initiated by a user operating the application 106 (e.g., a mouse click, mouse movement, etc.). The event processor 226 detects the event 202, and determines the event type (e.g., pointer movement, object modification, etc). The event processor 226 passes event information 204, comprising the event type, to the rule engine 210. The rule engine 210 accesses a rule repository 208 to identify rules 112 subscribing to the event type of the event 202. The rule engine 210 executes each rule 112 identified as subscribing to the event 202, and each rule 112 executed analyzes the event 202 and in at least some embodiments, analyzed the application 106 for effects caused by the event 202. Each executed rule 112 may manipulate the objects of the script 114 by, for example, adding a step 212 to the script 114 or modifying a previously existing step 212 in the script 114. Each step 212 is indicative of an application 106 related operation that may be performed when the script 114 is replayed. Manipulation of the script 114 by a rule 112 generates an event 206 that is presented to the event processor 226 for subsequent processing.

For example, if a first event 202 is a mouse button down event, a rule 112 subscribing to a user selection event may be invoked, and the rule 112 may create a mouse down step 212 in the script 114. A subsequent mouse up event 202 may result in invocation of a different rule 112 that creates a mouse click step 212 based on the mouse up event and the previously recorded mouse down step 212. Creation of the click step 212 may generate an event 206 that causes invocation of rules 112 configured to analyze a click. One such exemplary rule 112 may determine that the click was directed to a calendar object, and create a set date step 212 in the script 114. In some cases, a rule 112 may recognize that an event 202, 206 is indicative of a variety of possible operations, and therefore, may create multiple alternative steps 210 in the script 114.

Embodiments of the event processor 226 and the rule engine 210 can be implemented as dedicated circuitry and/or one or more processors (e.g., the processor 102) programmed to perform the functions described herein.

FIG. 3 shows a flow diagram for a method of rule-based automation of an application in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 3, as well as other operations described herein, can be implemented as instructions stored in a computer readable medium and executed by one or more processors (e.g., processor 102).

In block 302, an application program 106 is executing on the system 100. The application 106 may be a web application downloaded in whole or in part from the remote system 122 for execution by the processor 102 in a browser, or in some cases outside a browser. The system 100 is configured to record operations affecting the application 106 for future playback, thereby automating playback of the application 106.

In block 304, the event processor 226 detects an event 202 that may affect the application 106. For example, a user may select, via a user input device 116 (e.g., by clicking), an object displayed by the application 106. The event processor 226 determines the type of event 202 detected, and passes event information 204 to the rule engine 210.

In block 306, the rule engine 210 identifies rules 112 subscribing to the type of event 202 detected by the event processor 226. Each rule 112 may be applicable to analyzing one or more types of event 202, and consequently may subscribe to one or more specific types of events, and/or families of events. The rule engine 210 identifies rules 112 for execution based on the event information 204 passed from the event processor 226 and subscription information provided by each rule 112.

In block 308, the rule engine 210 invokes each identified rule 112 to analyze the event 202 and/or the effects of the event 202 on the application 106. In some embodiments, a rule 112 examines objects of DOM or other model associated with the application 106 to determine what effects the event 202 has caused in the application 106.

In block 310, a rule 112 invoked in response to the event 202 provides a result of analysis. The result may be added to the script 114 as a new step 212 or operation, or as a modification to a step 212 previously recorded in the script 114.

The data structures of the script 114 (e.g., in which a step 212 is stored) are themselves event sources, and creation or modification of a script 114 data structure may generate an event 206. In block 312, if a result of analysis by a rule 112 generates a new step 212 or modifies a preexisting step 212, then a new event 206 is generated in block 314. Responsive to the new event 206, event detection and rule 112 identification and invocation are iterated.

The above discussion is meant to be illustrative of the principles and various embodiments of the present invention. Numerous variations and modifications will become apparent to those skilled in the art once the above disclosure is fully appreciated. For example, while script recording and automation of an application have been generally described by reference to a web application, those skilled in the art will understand that embodiments are applicable to a variety of different applications. It is intended that the following claims be interpreted to embrace all such variations and modifications.

What is claimed is:

1. An automation system, comprising:
   an event processor configured to detect events affecting execution of an application being monitored by the automation system;
   a plurality of rules, each rule configured to analyze at least one of the detected events and to provide a result of the analysis that is further analyzed by a different one of the rules; and
   a rule engine coupled to the event processor and the plurality of rules;
   wherein the rule engine is configured to apply each rule to at least one of the detected events based on a value of the rule that determines an event type that the rule is configured to analyze;
   wherein the events comprise input device signals to affect execution of the application.

2. The automation system of claim 1, wherein each rule is independent of each other rule.

3. The automation system of claim 1, wherein the result is stored as a step of a script configured to replicate operations causing the detected event when the script is executed.

4. The automation system of claim 3, wherein the rule engine applies a rule to the step that analyzes the step and modifies the step.

5. The automation system of claim 3, wherein the rule engine applies a rule to the step that analyzes the step and provides a result that is stored as a different step.

6. The automation system of claim 3, wherein the script comprises an object based model of operations affecting the application, and wherein the rules are configured to access and manipulate the objects.

7. The automation system of claim 1, wherein at least one of the rules is configured to create a rule not previously existing in the automation system.

8. The automation system of claim 1, wherein application of a rule by the rule engine generates an event detectable by the event processor.

9. The automation system of claim 1, wherein the rules are configured to analyze changes in the structure of the application and to formulate the result based on a detected change in application structure caused by a detected event.

10. The automation system of claim 1, wherein a rule is configured to analyze one or more types of detected events based on the value.

11. The automation system of claim 1, wherein each rule comprises expertise in a knowledge domain corresponding to events that the rule is configured to analyze.

12. A method, comprising:
executing, by a processor, an application program;
detecting, by the processor, a first event affecting the execution;
invoking, by the processor, a first rule that analyzes the detected first event and an effect of the first event on the execution;
providing, by the processor, a result of the analysis by the first rule;
creating a second event responsive to providing the result;
invoking, by the processor, a second rule that analyzes the second event and the result of the analysis by the first rule; and
providing, by the processor, a result of the analysis by the second rule;
wherein the result of the analysis by the first rule and the result of the analysis by the second rule comprise steps stored as a script describing operations affecting the application program.

13. The method of claim 12, wherein the first rule and the second rule are independent of one another.

14. The method of claim 12, wherein the second rule modifies the result of the analysis by the first rule.

15. The method of claim 12, further comprising creating the second rule by execution of the first rule.

16. The method of claim 12, further comprising determining whether to invoke the first rule based on a stored subscription value indicating the types of events to which the first rule is applicable.

17. A non-transitory computer-readable medium encoded with a computer program that when executed by a computer causes the computer to:
detect an event related to execution of an application program being monitored;
invoke a first rule that analyzes the detected event;
provide a result of the analysis by the first rule;
create a different event related to execution of an application program responsive to providing the result;
store the result of the analysis by the first rule as a step of a script describing operations affecting the application program; and
invoke a second rule that analyzes the different event in conjunction with the step of the script.

18. The computer readable medium of claim 17 further encoded with a computer program that causes the rule to modify the result of analysis by a different rule.

19. The computer readable medium of claim 17 wherein the rule is further configured to analyze at least one of an effect of the event on execution of the application program and a result of analysis of a previously detected event provided by invocation of a different rule.

20. The computer readable medium of claim 17 further encoded with a computer program that causes invocation of the rule based on a stored subscription value indicating the types of events to which the rule is applicable.

* * * * *